United States Patent
Hou et al.

(10) Patent No.: US 7,356,108 B1
(45) Date of Patent: Apr. 8, 2008

(54) OFDM RECEIVER HAVING ADAPTIVE CHANNEL ESTIMATOR FOR CORRECTING CHANNEL FADING BASED ON ACCUMULATED PSEUDO POWER VALUES

(75) Inventors: Ping Hou, San Carlos, CA (US); Harish Kutagulla, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 805 days.

(21) Appl. No.: 10/817,811

(22) Filed: Apr. 6, 2004

(51) Int. Cl.
*H04K 1/10* (2006.01)

(52) U.S. Cl. ............... 375/360; 375/260; 375/230; 375/229

(58) Field of Classification Search ............ 375/260, 375/229, 230, 360
See application file for complete search history.

(56) References Cited

U.S. PATENT DOCUMENTS

| 7,085,315 B1* | 8/2006 | Kelton ............... 375/219 |
| 2003/0223353 A1* | 12/2003 | Wallace ............... 370/206 |
| 2005/0026565 A1* | 2/2005 | Goldstein et al. ....... 455/67.11 |

OTHER PUBLICATIONS

IEEE Std. 802.11a-1999, "Part 11: Wireless LAN Medium Access Control (MAC) and Physical Layer (PHY) specifications: High-speed Physical Layer in the 5 GHZ Band", L.AN/MAN Standards Committee of the IEEE Computer Society, IEEE-SA Standards Board, Approved Sep. 16, 1999, New York, USA.

\* cited by examiner

*Primary Examiner*—Mohammed Ghayour
*Assistant Examiner*—Juan Alberto Torres
(74) *Attorney, Agent, or Firm*—Manelli Denison & Selter PLLC; Leon R. Turkevich

(57) ABSTRACT

A channel estimator is configured for determining a gain adjustment for a received wireless signal having a prescribed plurality of tones. The channel estimator is configured for generating, for each of the tones, a corresponding pseudo power value representing a detected power level for the corresponding tone. An accumulated pseudo power value is obtained based on accumulating the respective pseudo power values of the prescribed plurality of tones. Each of the pseudo power values is selectively adjusted by an adjustment factor based on a determined difference between the accumulated pseudo power value relative to an expected accumulated power level relative to a prescribed dynamic range. The pseudo power values are then output for decoding of data modulated at the respective tones.

10 Claims, 3 Drawing Sheets

OFDM RECEIVER HAVING ADAPTIVE CHANNEL ESTIMATOR FOR CORRECTING CHANNEL FADING BASED ON ACCUMULATED PSEUDO POWER VALUES

BACKGROUND OF THE INVENTION

1. Field of the Invention

The present invention relates to implementation of a Channel Estimator in a wireless receiver, for example a IEEE 802.11a based Orthogonal Frequency Division Multiplexing (OFDM) receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11a based OFDM PHY in hardware involves providing a cost-effective, compact device that can be implemented in smaller wireless devices. Hence, implementation concerns typically involve cost, device size, and device complexity.

For example, conventional design approaches for an equalizer design would be to determine an estimate of channel effects on a transmitted signal, and implement equalizer coefficients based on the inverse function of the estimate of the channel effects. In particular, FIG. 1 is a diagram illustrating a frequency based receiver model 10, where a transmitter 12 outputs a frequency modulated signal X(f). The frequency modulated signal X(f) encounters frequency-selective channel distortion H(f) 14 (i.e., fading), and white Gaussian noise N(f) 16. Hence, the wireless signal Y(f) received by the receiver can be characterized by the transfer function:

$$Y(f)=X(f)H(f)+N(f).$$

A conventional approach to designing a frequency equalizer 18 would involve obtaining an estimate for the channel distortion H(f), and generating an inverse of the channel distortion, such that an estimate X'(f) of the frequency modulated signal X(f) can be obtained by Y(f)/H(f), or equivalently Y(f)*[1/H(f)].

However, instances of deep fading may substantially distort certain tones of a received signal to the extent that conventional attempts to equalize the received signal are insufficient. Hence, it is more unlikely that the receiver will decode the transmitted signal correctly.

SUMMARY OF THE INVENTION

There is a need for an arrangement that enables a wireless transceiver to perform equalization of a received frequency-modulated signal in an efficient and economical manner.

There also is a need for an arrangement that enables a wireless transceiver to perform channel evaluation of received tones for optimal decoding of transmitted information.

There also is a need for an arrangement that enables a wireless receiver to correctly decode tones of a received frequency-modulated signal, even when the frequency-modulated signal has encountered deep fading.

These and other needs are attained by the present invention, where a channel estimator is configured for determining a gain adjustment for a received wireless signal having a prescribed plurality of tones. The channel estimator is configured for generating, for each of the tones, a corresponding pseudo power value representing a detected power level for the corresponding tone. An accumulated pseudo power value is obtained based on accumulating the respective pseudo power values of the prescribed plurality of tones. Each of the pseudo power values is selectively adjusted by an adjustment factor based on a determined difference between the accumulated pseudo power value relative to an expected accumulated power level relative to a prescribed dynamic range. The pseudo power values are then output for decoding of data modulated at the respective tones.

Hence, decoding performance is substantially improved by identifying tones having encountered substantial fading relative to the entire spectrum of prescribed tones. Further, implementation is simplified by utilizing pseudo power values as an approximation of real power values.

One aspect of the present invention provides a method in an OFDM receiver configured for receiving a wireless signal having a prescribed plurality of tones. The method includes generating, for each of the tones, a corresponding pseudo power value representing a detected power level in the corresponding tone of a prescribed symbol. The method also includes obtaining an accumulated pseudo power value based on accumulating the respective pseudo power values of the prescribed plurality of tones for the prescribed symbol, determining a gain adjustment factor based on a determined difference between the accumulated pseudo power value relative to a prescribed detection level for the prescribed symbol, and adjusting each of the pseudo power values by the gain adjustment factor. The method also includes outputting the pseudo power values after adjustment by the gain adjustment factor, for decoding of data modulated at the respective tones and based on the respective pseudo power values.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11a OFDM transceiver, followed by a detailed description of the channel estimator implemented according to an embodiment of the present invention.

RECEIVER ARCHITECTURE OVERVIEW

Figure 2:
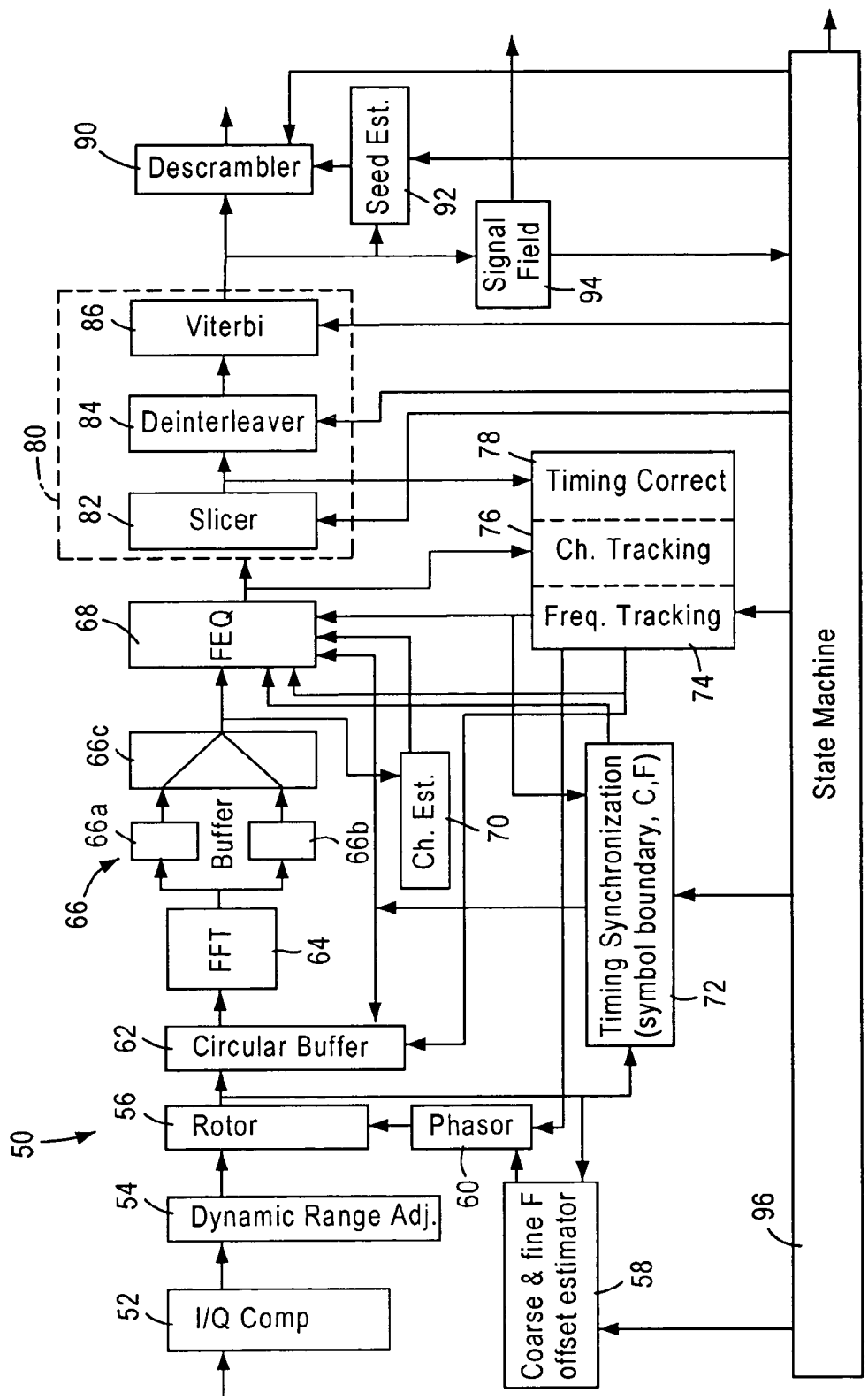
FIG. 2 is a diagram illustrating a receiver module of an IEEE 802.11a OFDM transceiver having a deinterleaver implemented according to an embodiment of the present invention.

FIG. 2 is a diagram illustrating an architecture of a receiver module 50 of an IEEE 802.11a Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F front end, for example a receiver amplifier. The detected wireless signal samples include an I component and Q component: these I and Q components, which normally should be orthogonal to each other and have a uniform relative gain, may in fact have a non-orthogonal phase difference (i.e., other than 90 degrees) and have a nonequal gain. Hence, the I/Q mismatch compensation module is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, two identical long training sequences, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequences in the IEEE 802.11a preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11a specification.

The descrambler circuit 90 is configured for recovering the original serial bit stream from the decoded data, by descrambling a 127-bit sequence generated by the scrambler of the transmitter, according to the IEEE 802.11a specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11a compliant Media Access Controller (MAC).

CHANNEL ESTIMATOR FOR CORRECTING CHANNEL FADING

Figure 1:
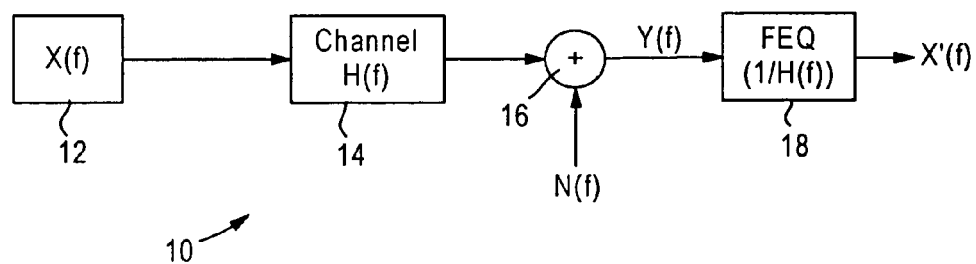
FIG. 1 is a (PRIOR ART) diagram illustrating a frequency based receiver model for equalizing a received signal.
Figure 3:
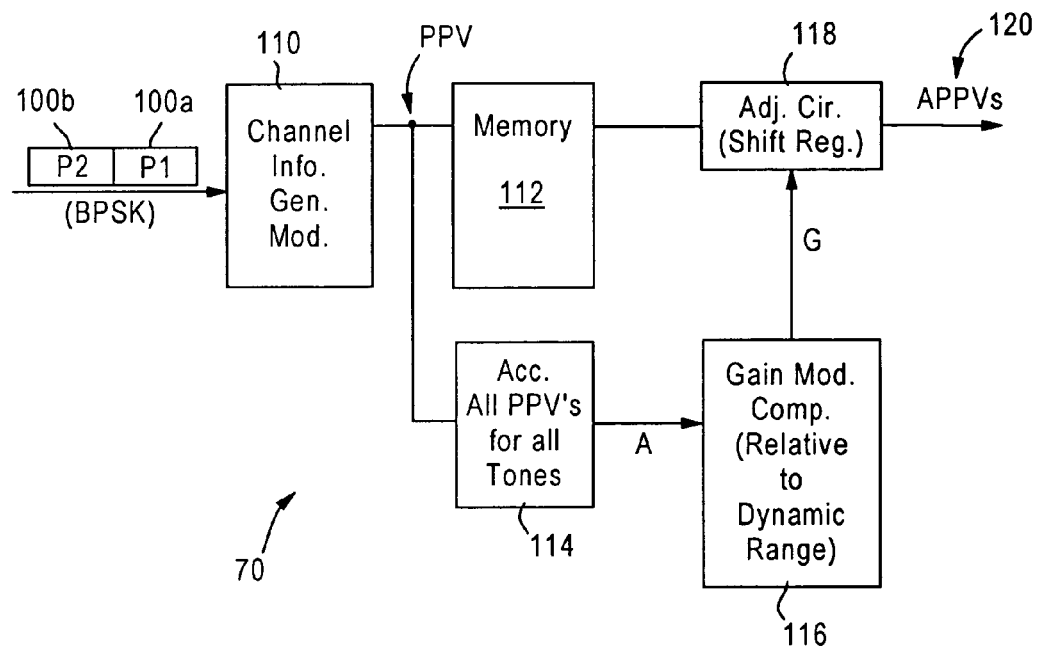
FIG. 3 is a block diagram illustrating a channel estimator according to an embodiment of the present invention.

FIG. 3 is a diagram illustrating in detail the channel estimator 70 of FIG. 2, according to an embodiment of the present invention. The channel estimator 70 is configured for identifying the first and second long preambles 100a, 100b from the received wireless signal. In particular, Section 17.3.3 of the IEEE 802.11a Specification describes that the preamble field, used for synchronization, includes ten (10) short symbols and two identical long symbols. The long symbols 100a, 100b include 53 subcarriers (including 52 tones and a zero value at DC) which are modulated according to a prescribed sequence. Hence, these prescribed long symbols can be determined by the channel estimator 70 for each tone.

The channel estimator 70 includes a channel information generator module 110, a nonvolatile memory 112, an accumulator 114, a gain module 116, and an adjustment circuit implemented as a controllable shift register responsive to a gain adjustment factor (G) output by the gain module 116.

According to the disclosed embodiment, the channel estimator 70 provides channel information, in the form of adjusted pseudo power values (APPVs) 120, to the channel decoder 86, enabling the channel decoder 86 to determine which signal is relatively reliable. In other words, the Viterbi decoder 86, based on the adjusted pseudo power values 120, utilizes a weighting function provided by the channel estimator wherein the Viterbi decoder 86 applies a relatively large weight factor for APPVs indicating a reliable signal and small weight factor for APPVs indicating an unreliable signal. Hence, the decoding performance of the Viterbi decoder 86 can be substantially improved.

Figure 4:
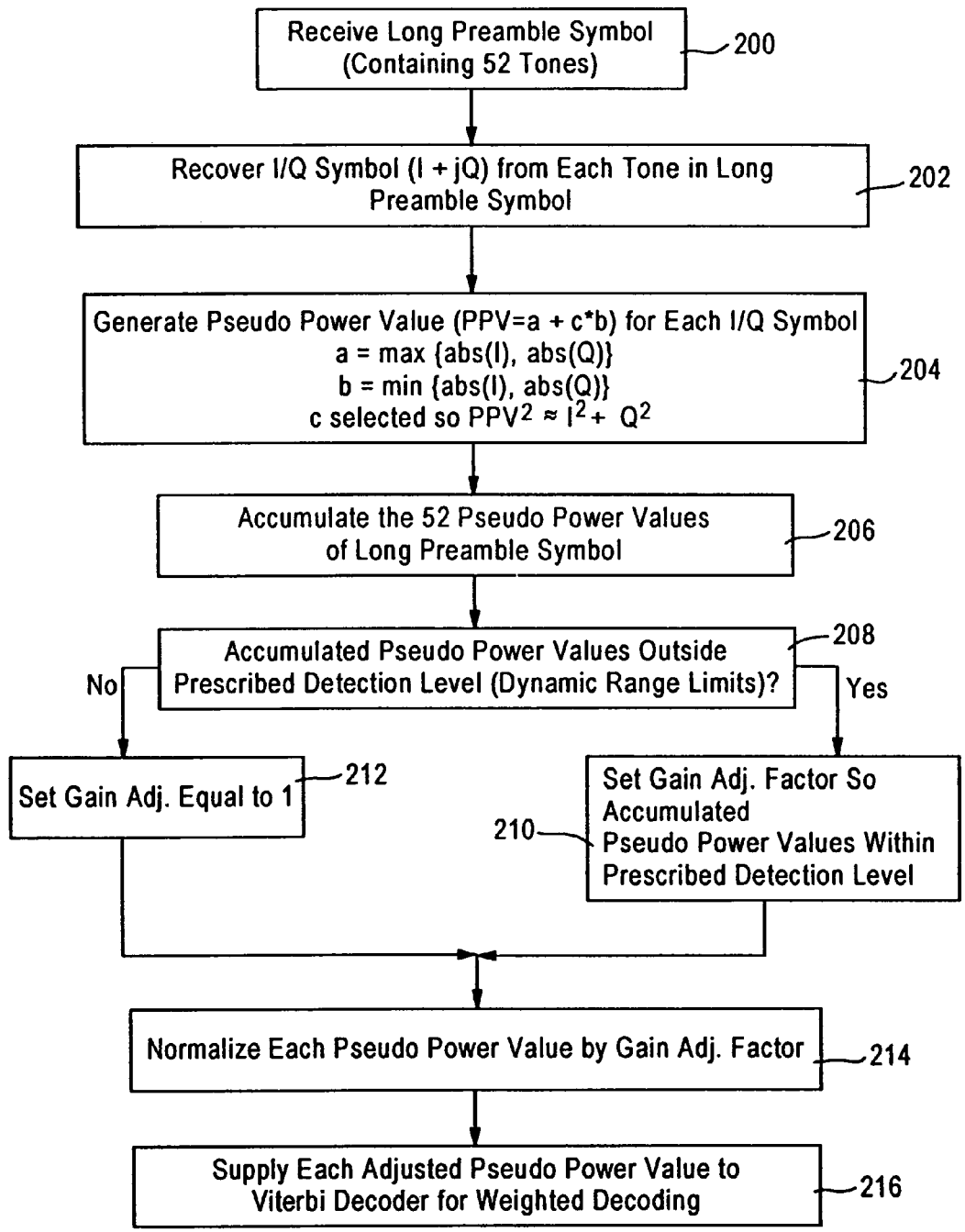
FIG. 4 is a diagram illustrating the method of calculating adjusted power values for use by a Viterbi decoder, according to an embodiment of the present invention.

FIG. 4 is a diagram illustrating the method of generating adjusted pseudo power values 120 for weighted Viterbi decoding, according an embodiment of the present invention. The channel information generator module 110 receives in step 200 one of the long preamble symbols 100a or 100b containing fifty-two (52) symbols modulated at respective subcarrier frequencies (i.e., tones), and recovers in step 202 the I/Q symbol for each tone in the long preamble symbol.

Use of the long preambles 100a and/or 100b to compute channel information in the form of the PPVs has the benefit that the long preambles 100a and 100b are modulated according to the relatively robust BPSK modulation, which is more immune to channel noise and fading disturbance. Since a BPSK signal always has the same power level (assume the power level is at a value of one unit, e.g., 1 dBm) in the frequency domain at transmitter, if the power of a received BPSK signal for a specific tone has a value that is substantially different than the one unit output at the transmitter, then this tone is highly disturbed most likely due to fading, as it is less likely for channel noise to cause tone-specific deviations in power levels. However, attempting to find a power or square root of power for a given signal requires complex-valued multiplication.

According to the disclosed embodiment, channel estimation is implemented efficiently in hardware by computing pseudo power for each tone by simple addition and shifting. In particular, for each I/Q symbol (I+jQ) for a given tone, where j is the square root of −1, the channel information generator module 110 generates in step 204 a pseudo power value (PPV) as according to the equation "PPV=a+c*b", where a=max {abs(I), abs(Q)}, b=min {abs(I), abs(Q)}, abs(x) is the absolute value of real-number x, max {x,y} is the maximum of two non-negative real-valued numbers and min {x,y} is the minimum of two non-negative real-valued numbers.

In addition, a prescribed fixed-point multiplier "c" is chosen so that, in the digital domain (when fixed-point operations are implemented), the value of $(a+c*b)^2$ is as close as practicable to approximate the power of I+jQ, i.e., "$I^2+Q^2$". Note that the value of the prescribed fixed-point multiplier "c" has to be a positive number which allows multiplication to be easily implemented, for example, if c has a value of ¼, the calculation c*b is executed simply by right-shifting the value of "b" by 2 bits. Experimental evaluation has shown that the prescribed fixed-point multiplier "c" can be chosen to have a value of ⅜.

After the pseudo power value for each tone is calculated in step 204, each pseudo power value (PPV) for the preamble symbol (e.g., 100a) is stored in the memory 112, and the sum of the pseudo power over all the tones is calculated in step 206 by the accumulator 114. The accumulated pseudo power value (A) is compared by the gain module 116 relative to a prescribed detection level (e.g., a prescribed dynamic range). If in step 208 the accumulated pseudo power value (A) falls outside the prescribed dynamic range established for the acceptable accumulated power levels, the gain module 116 sets the gain adjustment factor (G) in step 210 to a value to adjust the accumulated pseudo power value (A) to within the prescribed dynamic range. However, if the accumulated pseudo power value (A) is within the prescribed dynamic range, the 116 sets the gain (G) in step 212 to equal "1" (i.e., no change).

By multiplying the accumulated pseudo power value by a suitable factor (G), the sum can be adjusted to within the normal dynamic range. Since multiplication satisfies superposition law, such an adjustment means that pseudo power over each tone should be adjusted by the same factor in order to make the sum within the normal sum range.

Hence, the adjustment circuit 118 implements the adjustment in step 214 by digitally shifting each pseudo power value, for each corresponding tone, by the gain adjustment factor G. This implementation is particularly beneficial for fixed-point implementation, since it applies finite-length resolution which defines the normal range. For example, left-shifting all the pseudo power values for each tone by 1 bit or 2 bits corresponds to multiplying each pseudo power value by 2 or 4, respectively.

The adjusted pseudo power value (APPV) 120 for each tone is output in step 216 for use by the Viterbi decoder: if an APPV for a given tone ($APPV_i$) has a relatively high value compared to the normalized accumulated pseudo power value after adjustment (i.e., $APPV_i \gg A*G/52$), indicating a reliable signal sample, the Viterbi decoder 86 applies a relatively large weighting for channel decoding; in contrast, if an APPV for a given tone ($APPV_i$) has a relatively low value compared to the normalized accumulated pseudo power value after adjustment (i.e., $APPV_i \ll A*G/52$), indicating an unreliable signal sample, the Viterbi decoder 86 applies a relatively small weighting for channel decoding.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM receiver configured for receiving a wireless signal having a prescribed plurality of tones, the method including:
   generating, for each of the tones, a corresponding pseudo power value representing a detected power level in the corresponding tone of a prescribed symbol;
   obtaining an accumulated pseudo power value based on accumulating the respective pseudo power values of the prescribed plurality of tones for the prescribed symbol;
   determining a gain adjustment factor based on a determined difference between the accumulated pseudo power value relative to a prescribed detection level for the prescribed symbol;
   adjusting each of the pseudo power values by the gain adjustment factor; and
   outputting the pseudo power values after adjustment by the gain adjustment factor, for decoding of data modulated at the respective tones and based on the respective pseudo power values.

2. The method of claim 1, wherein the generating step includes generating the pseudo power values using a BPSK-encoded long preamble symbol as the prescribed symbol.

3. The method of claim 2, wherein each tone of the long preamble symbol has a corresponding I component and a corresponding Q component, the generating step including generating each pseudo power value by:
   identifying a first digital value as a maximum absolute value relative to the I component and the Q component;
   identifying a second digital value as a minimum absolute value relative to the I component and the Q component;
   shifting the second digital value relative to a prescribed fixed-point multiplier; and
   generating the pseudo power value by adding the first digital value by the shifted second digital value, the prescribed fixed-point multiplier causing the pseudo power value to approximate a theoretical power value of the long preamble symbol at the corresponding tone.

4. The method of claim 2, wherein the prescribed detection level corresponds to a prescribed dynamic range of the OFDM receiver.

5. The method of claim 1, wherein the adjusting step includes digitally shifting each of the pseudo power values according to the gain adjustment factor.

6. An OFDM receiver configured for receiving a wireless signal having a prescribed plurality of tones, the receiver comprising:
   a first module configured for generating, for each of the tones, a corresponding pseudo power value representing a detected power level in the corresponding tone of a prescribed symbol;
   an accumulator configured for generating an accumulated pseudo power value based on accumulating the respective pseudo power values of the prescribed plurality of tones for the prescribed symbol;
   a gain module configured for determining a gain adjustment factor based on a determined difference between the accumulated pseudo power value relative to a prescribed detection level for the prescribed symbol; and
   an adjustment circuit configured for adjusting each of the pseudo power values by the gain adjustment factor and outputting the pseudo power values after adjustment by the gain adjustment factor, for decoding of data modulated at the respective tones and based on the respective pseudo power values.

7. The receiver of claim 6, wherein the first module is configured for generating the pseudo power values using a BPSK-encoded long preamble symbol as the prescribed symbol.

8. The receiver of claim 7, wherein each tone of the long preamble symbol has a corresponding I component and a corresponding Q component, the first module configured for generating each pseudo power value by:
   identifying a first digital value as a maximum absolute value relative to the I component and the Q component;
   identifying a second digital value as a minimum absolute value relative to the I component and the Q component;
   shifting the second digital value relative to a prescribed fixed-point multiplier; and
   generating the pseudo power value by adding the first digital value by the shifted second digital value, the prescribed fixed-point multiplier causing the pseudo power value to approximate a theoretical power value of the long preamble symbol at the corresponding tone.

9. The receiver of claim 7, wherein the prescribed detection level corresponds to a prescribed dynamic range of the OFDM receiver.

10. The receiver of claim 6, wherein the adjustment circuit is configured for digitally shifting each of the pseudo power values according to the gain adjustment factor.

* * * * *